United States Patent [19]
Baxter

[11] Patent Number: 5,802,996
[45] Date of Patent: Sep. 8, 1998

[54] SOIL AERATOR FERTILIZER AND METHOD

[76] Inventor: Bill J. Baxter, 220 Osprey Dr., Hot Springs, Ark. 71902

[21] Appl. No.: 439,491

[22] Filed: May 12, 1995

[51] Int. Cl.⁶ .............................. A01B 45/02; A01C 15/00
[52] U.S. Cl. ............................................... 111/118; 172/21
[58] Field of Search ........................... 111/118, 119, 129, 111/128, 7.1; 172/21

[56] References Cited

U.S. PATENT DOCUMENTS

| | | | |
|---|---|---|---|
| 3,025,806 | 3/1962 | Peck | 111/128 |
| 3,397,542 | 8/1968 | Moulden | 111/118 |
| 3,450,073 | 6/1969 | Baker | 111/118 |
| 3,640,234 | 2/1972 | Carroll et al. | 111/118 |
| 3,659,536 | 5/1972 | White | 111/7.1 |
| 3,911,837 | 10/1975 | Quick | 111/7 |
| 4,246,854 | 1/1981 | Lempa, Jr. | 111/96 |
| 4,429,647 | 2/1984 | Ziuck | 111/118 |
| 4,566,543 | 1/1986 | Kotani | 111/118 |
| 4,570,553 | 2/1986 | Ito | 111/118 |
| 4,572,087 | 2/1986 | Brannan | 111/56 |
| 4,624,194 | 11/1986 | Zinck | 111/7.2 |
| 4,649,836 | 3/1987 | Overocker | 111/6 |
| 4,705,218 | 11/1987 | Daniels | 239/271 |
| 4,807,545 | 2/1989 | Joy | 111/7.1 |
| 4,872,411 | 10/1989 | Nagy | 111/7.1 |
| 5,005,601 | 4/1991 | Strong | 137/205.5 |
| 5,101,745 | 4/1992 | Poderals et al. | 111/127 |
| 5,115,750 | 5/1992 | White et al. | 172/21 |
| 5,133,625 | 7/1992 | Albergo et al. | 111/118 |
| 5,322,085 | 6/1994 | Prothe | 137/614.2 |
| 5,370,069 | 12/1994 | Monroe | 111/127 |

FOREIGN PATENT DOCUMENTS

| | | | |
|---|---|---|---|
| 962191 | 6/1950 | France | 111/7 |
| 1522537 | 4/1968 | France | 111/118 |
| 3616834 | 4/1987 | Germany | 111/118 |
| 356300 | 9/1961 | Switzerland | 172/21 |

*Primary Examiner*—Terry Lee Melius
*Assistant Examiner*—Christopher J. Novosad
*Attorney, Agent, or Firm*—Head, Johnson & Kachigian

[57] ABSTRACT

A soil aerator fertilizer especially adapted for the treatment of trees in an orchard-like setting includes hydraulic cylinder units mounted on opposing sides of a trailer or vehicle so that trees on either side of the trailer can be simultaneously treated while the trailer is intermittently moved through the orchard. Each of the hydraulic cylinder units includes an extensible piston having a ground penetrating probe attached thereto. The trailer or vehicle also supports a source of hydraulic fluid, a source of pressurized air or gas, a source of an aqueous fertilizer and/or nutrient mixture, and valves for selectively controlling the flow of pressurized hydraulic fluid to and from the hydraulic cylinder units and for selectively supplying either pressurized air or gas, or liquid fertilizer and/or nutrient mixture to the probe for distribution below the surface of the soil. A four-position T-shaped control valve is used for selectively directing pressurized air or liquid fertilizer and/or nutrient media to each of the probes once they have been inserted beneath the surface of the soil. The subsurface aeration and application of aqueous treatment media in accordance with the present invention reduces or eliminates environmental contamination, reduces or eliminates fertilizer or other treatment chemical requirements, and increases plant, tree or crop production.

15 Claims, 6 Drawing Sheets

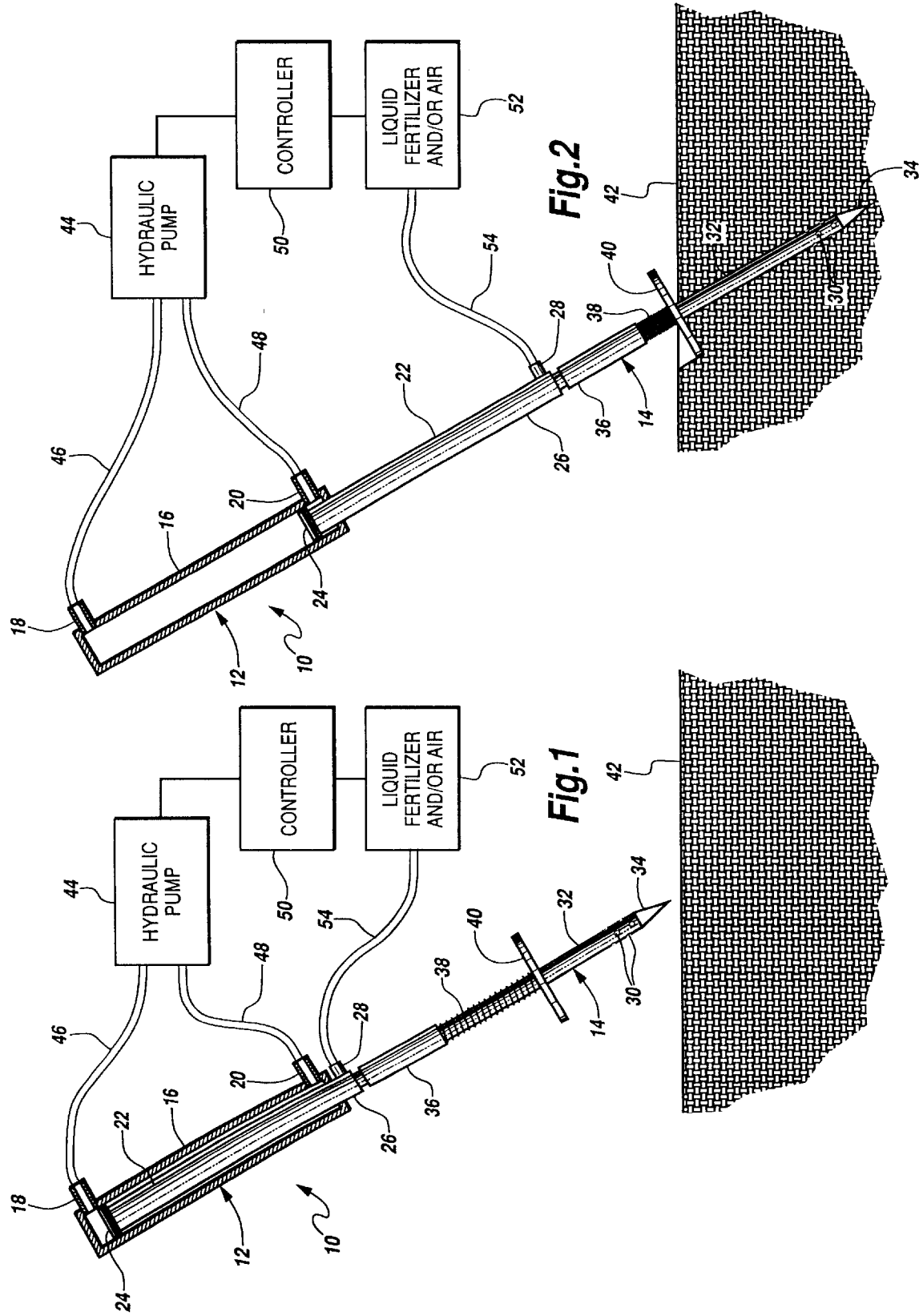

SOIL AERATOR FERTILIZER AND METHOD

BACKGROUND OF THE INVENTION

The present invention is directed to apparatus, systems and methods for loosening, breaking, fracturing, oxygenating, fertilizing and otherwise chemically treating subsurface soil and roots and more particularly concerns a soil aerator and fertilizer apparatus, system and method utilizing a hydraulic ram or cylinder to intermittently drive a fertilizer probe into the soil to provide for subsurface injection of compressed air, gases, agricultural chemicals, fertilizers, bacteria and the like for treating the soil or roots to enhance root and plant growth or production, to promote root zone expansion, to adjust soil/water/air ratios, to improve drainage, to reduce compaction, to compensate for surface barriers, to conserve energy, and/or to reduce environmental hazards.

Manually operated hand held fertilizer injectors or root feeders for applying or disbursing a liquid fertilizer below the surface of the soil are described, for example, in U.S. Pat. Nos. 3,659,536, 4,705,218, 4,872,411 and 5,322,085. Such root feeding devices include an elongate hollow pipe or feed tube having a lower, ground penetrating pointed end with discharge openings and an upper end fitted with a transverse handle. The handle is connected to a liquid source of either water or liquid fertilizer by a long cumbersome hose. The device may include a small fertilizer supply container either in the handle or along the feed tube.

Such root feeding devices are used in the irrigating and fertilizing of subsurface root systems for trees and plants. In the usual method of operation, the pointed nozzle or tip of the feed tube is inserted into the soil as deep as the operator can push it. Thereafter, the liquid fertilizer solution is forced from the nozzle below the surface of the soil. Then, the nozzle is removed and inserted in a different location and the operation is repeated.

Such manually operated root feeders rely on the force exerted by the operator to insert the feed tube into the soil. This is particularly difficult in dry, hard or rocky soil. Also, such manual root feeders are attached to long hoses which are heavy and cumbersome to move or drag. These and other drawbacks limit the effectiveness and efficiency of operation of the root feeders.

In an attempt to aid the insertion of the feed tube or nozzle into the soil, the root feeding devices of U.S. Pat. Nos. 3,659,536 and 4,705,218 provide an axial flow of fluid at the nozzle tip. This axial flow of fluid is meant to soften or moisten the soil in the vicinity of the nozzle tip to decrease the exertion required to force the nozzle into the soil. However, this axial flow of fluid prior to or during insertion of the feed tube into the soil is wasteful and can lead to environmental hazards by leaving fertilizers or other chemicals on the soil surface.

In another attempt to facilitate insertion of the pointed end of the device into the soil, U.S. Pat. No. 4,872,411 discloses a fertilizer applicator device including a foot plate secured to an injector.

In contrast to the above described patents, U.S. Pat. Nos. 4,246,854 and 4,624,194 describe devices for injecting dry, powdered or granular substances into the soil. U.S. Pat. No. 4,246,854 discloses a fertilizer injector including a storage hopper and an elongate injector rod having a T-handle at its upper end and a pointed insertion tip at its lower end. U.S. Pat. No. 4,624,194 discloses a highly complicated apparatus for breaking of the ground for the cultivation of plants. The apparatus includes a rapid closing compressed air valve and a hopper or reservoir for injecting a powdered substance into the soil in an impact-like manner.

Hence, there exists a need for an improved soil aerator fertilizer apparatus, system and method.

SUMMARY OF THE INVENTION

In accordance with the present invention, a soil aerator fertilizer and method is provided which is elegantly simple in construction, easy to operate, and safe for the environment. Also, use of the soil aerator fertilizer conserves energy and reduces the costs involved in plant, fruit, or product growth, production and maintenance.

In accordance with an exemplary embodiment of the soil aerator fertilizer of the present invention especially adapted for the treatment of trees in an orchard-like setting, hydraulic cylinder units are mounted on opposing sides of a trailer or vehicle so that trees on either side of the trailer can be simultaneously treated while the trailer is intermittently moved through the orchard between adjacent rows of trees. Each of the hydraulic cylinder units includes an extensible piston having a ground penetrating probe attached thereto. The trailer or vehicle also supports a source of hydraulic fluid, a source of pressurized air or gas, a source of an aqueous fertilizer and/or nutrient mixture, and valves for selectively controlling the flow of pressurized hydraulic fluid to and from the hydraulic cylinder units and for selectively supplying either pressurized air or gas, or liquid fertilizer and/or nutrient mixture to the probe for distribution below the surface of the soil.

In accordance with an exemplary method of the present invention, the soil in the area of the drip line of a tree is treated with the soil aerator fertilizer by first activating one or more hydraulic units so as to extend the pistons thereof and drive each of the probes down into the soil. Next, pressurized air is released from the base of each of the probes so as to loosen, fracture, and aerate the soil in and around the roots, and especially the feed roots of the tree. Next, a selected quantity of a desired liquid fertilizer and/or nutrient media is injected into the aerated soil using a charge of pressurized air. Then, the cylinder units are deactivated so as to retract each of the pistons thereof and to remove each of the probes from the soil. The soil aerator fertilizer is moved to another position and the process is repeated.

The advantages of the present invention due to the eloquently simple construction thereof, are low cost of production, utilization or modification of off-the-shelf components, low maintenance, and ease of operation. The subsurface aeration and application of aqueous treatment media in accordance with the present invention reduces or eliminates environmental contamination, reduces or eliminates fertilizer or other treatment chemical requirements, and increases plant, tree or crop production by eliminating or reducing poor drainage, compaction and surface barriers, correcting the soil particle/water/air ratio, and facilitating root growth and absorption of nutrients.

In accordance with one example of the present invention, the apparatus is mounted on a trailer adapted to be towed behind a tractor or four-wheel all terrain vehicle with manually operated controls within reach of the vehicle operator. The extension and retraction of the cylinder units is controlled by a single hydraulic control lever which may be mounted adjacent the seat of the vehicle operator. A four-position T-shaped control valve is used for selectively directing pressurized air or liquid fertilizer and/or nutrient media to each of the probes once they have been inserted beneath the surface of the soil.

In accordance with another example of the present invention, the apparatus includes a computer control system which provides for centralized operator control of one or more soil aerator fertilizer units through a soil treatment cycle at each new location.

The principle object of the present invention is the provision of a soil aerator fertilizer and method which is eloquently simple in construction and utilization, easy to maintain and operate, environmentally safe, energy wise, and reduces the costs involved in fertilizing and treating plants, trees, or shrubs and producing crops or products such as lumber, fruits, nuts, and the like.

Another object of the present invention is the provision of a mobile soil aerator fertilizer apparatus which provides for the efficient, safe and effective treatment of trees or other plants.

A still further object of the present invention is the provision of a soil aerator fertilizer system which provides for the simultaneous treatment of a plurality of plants or a large soil area by a plurality of soil piercing probes.

A still further object of the present invention is the provision of a soil aerator fertilizer apparatus, system and method, which is environmentally safe and includes a soil surface seal for preventing the spray of liquid fertilizer and/or nutrient media above the surface of the soil.

Other objects and further scope of the applicability of the present invention will become apparent from the detailed description to follow, taken in conjunction with the accompanying drawings wherein like parts are designated by like reference numerals.

BRIEF DESCRIPTION OF THE DRAWINGS

FIG. 1 is a schematic side elevational view illustrating an exemplary embodiment of the soil aerator fertilizer of the present invention;

FIG. 2 is a schematic side elevational view of the soil aerator fertilizer of FIG. 1 with the hydraulic cylinder piston extended, and the probe partially inserted into the soil;

DETAILED DESCRIPTION OF THE PREFERRED EMBODIMENTS

Figure 3:
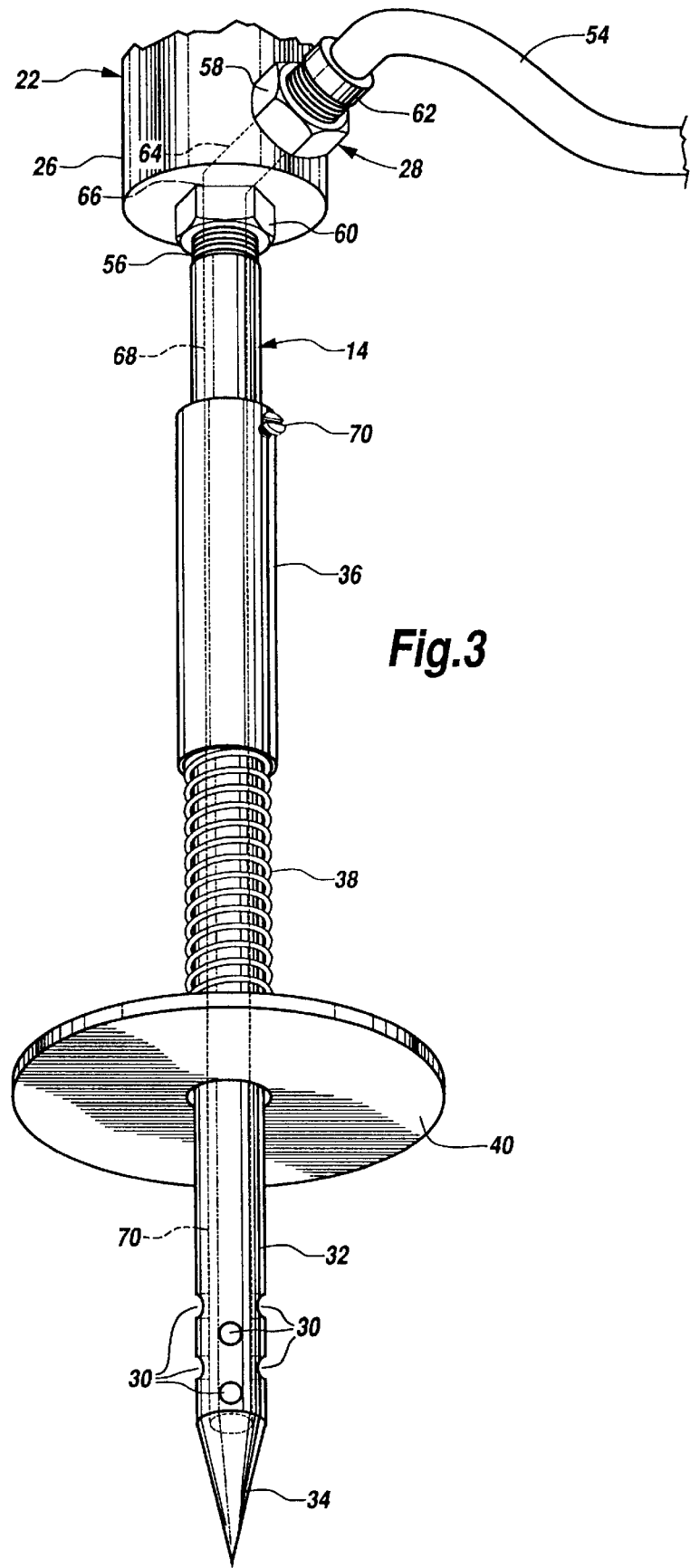
FIG. 3 is an enlarged perspective view representation of one example of the lower portion of the soil aerator fertilizer of FIG. 1.

In accordance with an exemplary embodiment of the present invention as shown in FIGS. 1 and 2 of the drawings, a soil aerator fertilizer apparatus generally designated by the reference numeral 10 is shown to include a hydraulic ram 12 and a probe 14 attached thereto. The hydraulic ram 12 includes an elongate cylinder or housing 16 having upper and lower (extension and retraction) hydraulic fluid ports 18 and 20. Housed within the cylinder 16 is an elongate piston or shaft 22 having an enlarged upper end or head 24 including one or more circumferential sealing elements for forming a fluid tight seal between the piston head and inner cylinder wall. The piston 22 is extended and retracted relative to the cylinder 16 upon application of pressurized hydraulic fluid to the respective ports 18 and 20.

Piston 22 has a lower end 26 which extends outwardly from cylinder 16 even when the piston is retracted. The probe 14 is attached to the lower end face of the piston 22. The lower end 26 of shaft 22 includes a liquid fertilizer and/or nutrient and pressurized air port 28 which provides fluid communication to a central fluid passage which runs the length of the probe 14, and terminates in one or more discharge openings 30 in or near the base thereof. Although it is preferred to include the liquid and/or air port 28 in the lower end of piston 22, it is contemplated that such a port could be added to the upper end of the probe 14, or could be made up of a T-shaped fitting which fits between the upper end of probe 14 and the lower end of the piston 22.

Probe 14 includes a cylindrical probe body or pipe 32 having a pointed lower end 34 forming a soil piercing insertion tip. Attached near the upper end of probe body 32 is a spring retaining collar 36 which not only serves as an anchor for the upper end of a coil spring 38, but also serves to facilitate the linear compression and expansion of the spring 38. Attached to the lower end of spring 38 is an annular air/surface seal or disc 40 having a circular central opening dimensioned just larger than the outer diameter of probe body 32 to provide for translational movement of the disc 40 along the probe body 32.

As shown in FIG. 1 of the drawings, the piston 22 is fully retracted within the cylinder 16 of hydraulic ram 12. In this position, the insertion tip 34 of probe 14 is located above the soil surface 42. Also in this position, spring 38 is fully extended and sealing disc 40 is located at its lower-most position on probe 14. With reference to FIG. 2 of the drawings, the position of the cylinder 16 with respect to the soil surface 42 has remained the same as in FIG. 1, but piston 22 has been fully extended to force probe 14 down into the soil a sufficient distance to cause seal disc 40 to contact the surface 42 of the soil, travel upwardly on probe body 32, and at least partially compress spring 38. In this position, the probe 14 is ready to aerate, fertilize, or otherwise treat the soil.

The hydraulic ram 12 of the soil aerator fertilizer 10 of FIGS. 1 and 2 is activated and the piston 22 is moved from the retracted position shown in FIG. 1 to the extended position shown in FIG. 2 of the drawings upon application of a pressurized fluid to port 18 and the escape of fluid from the cylinder 16 through port 20. A source of pressurized fluid 44, such as a hydraulic pump, provides hydraulic fluid under pressure selectively to hydraulic lines 46 and 48 operatively connected to ports 18 and 20 respectively. The hydraulic pump 44 is controlled via a controller 50 such as a conventional hydraulic control switch, lever or control panel, or by way of a computer control system providing for operator input and adjustment.

The piston 22 is retracted from the position shown in FIG. 2 to the position shown in FIG. 1 of the drawings upon application of the pressurized fluid to port 20, and allowing fluid to escape from the interior of cylinder 16 through port 18. Hence, hydraulic ram 12 operates in the conventional manner of a hydraulic cylinder, pneumatic cylinder, or other pressure driven linear actuator. It is preferred to use a hydraulic cylinder and hydraulic pump, since a large force, for example, 1500 pounds per square inch (psi), is required to drive the probe 14 deep into the soil, to do so quickly, and to maintain the extended position of the piston 22 (FIG. 2) during discharge of pressurized air and/or liquid from the probe 14.

A source 52 of pressurized air, gas, liquid or aqueous fertilizer, chemical, nutrient, other soil or plant treatment products and/or a mixture thereof is operatively connected to port 28 via a flexible conduit or line 54. Source 52 is controlled by controller 50, for example, control valves and/or computer control system to selectively provide for the discharge of one or more of pressurized air, gas, liquid fertilizer, nutrient, and/or other treatment product from the discharge openings 30 of probe 14 while the lower end 34 of probe 14 is buried within the soil as shown in FIG. 2 of the drawings. Sealing disc 40 is biased against the surface 42 of the soil by coil spring 38 so as to maintain a tight seal with the soil surface 42 adjacent probe body 32 to prevent the escape or spray of the pressurized air, gas, or liquid component discharged from the openings 30 in probe 14. The air/soil seal 40 environmental hazards, unnecessary waste of treatment products, and increases the efficiency of the aeration and fertilization of the subsurface soil.

In accordance with one example of the present invention, a soil aerator fertilizer is used to treat an approximately twenty foot diameter circular area of soil by driving the probe about twelve inches into the soil and discharging pressurized air at 200 psi from the buried tip of the probe. Upon aeration, the surface of the twenty foot diameter treated soil area raised from about two to six inches from its initial height.

With reference to FIG. 3 of the drawings and in accordance with a particular example of the present invention, the hydraulic unit 12 of soil aerator fertilizer 10 is a conventional hydraulic cylinder unit having a two inch or greater diameter piston shaft 22 modified to include the fertilizer and pressurized air or gas port 28 in the lower end 26 thereof. Also, lower end 26 of shaft 22 has been modified so as to accept an upper, externally threaded end 56 of the probe 14. Hence, the probe 14 is replaceable as necessary due to wear or damage thereto. Also, it is contemplated that an extension shaft or pipe may be added between the probe 14 and piston 22 to adjust the length of the probe to accommodate, for example, the use of the soil aerator fertilizer on different vehicles, at different heights above the soil surface, or to selectively choose a desired insertion depth of the probe 14.

Also in accordance with a particular example of the present invention, a three inch outer diameter stainless steel shaft 22 is modified by being drilled, tapped, and affixed with a fitting 58 to form the air/liquid port 28 and a fitting 60 to provide an attachment base or receptacle for the probe 14. Fitting 58 has internal threads adapted to receive the external threads on a fitting 62 at the end of high pressure hose 54. Likewise, fitting 60 has a threaded central opening adapted to receive the external threads on the upper end 56 of probe 14. In the example, probe 14 is made of ⅝ inch outer diameter stainless steel pipe or rod, and fittings 58, 60, and 62 are formed of stainless steel. Line or conduit 54 is preferably a flexible high pressure (HP) nylon or corrosion resistant hose made for 300 psi or greater operating conditions.

Fittings 58 and 60 are received within respective legs or openings of an L-shaped bore having a first, transverse leg or opening 64 extending from the outer surface of the shaft to the center line of the shaft 22 and a second axial leg 66 extending along the center line of shaft 22 from the lower end face of the shaft and meeting up with the first bore 64. The openings 64 and 66 are tapped so as to receive external threads on fittings 58 and 60.

Further, in accordance with the particular example, probe shaft or body 32 is about 24 inches long, has a ⅝ inch outer diameter and a ⅜ inch inner diameter, cylindrical, elongate, axial passage 68. Spring retainer 36 is a one inch outer diameter section of stainless steel pipe attached to probe body 32 via a stainless steel set screw 70. Insertion tip 34 is attached to the lower end of probe body 32 and has a hardened or carburized pointed tip that can withstand the dynamic forces presented when the probe 14 is thrust into the soil and resists wear caused by repeated uses of the device. Seal 40 is a 5 inch outer diameter annulus of ¼ inch thick stainless steel plate having a central opening sized just larger than the outer diameter of probe shaft 32. Lastly, the elongate axial fluid passage 68 extends from the upper end 56 of probe 14 to the discharge openings 30 and together with bores 64 and 66 provides fluid communication between the port 28 and discharge openings 30.

In accordance with one example, the hydraulic ram of the soil aerator fertilizer is a custom hydraulic cylinder produced by SCH Company of Little Rock, Ark. having an overall length of about 20 inches and a piston shaft with an outer diameter of three inches. Also, in accordance with one example of the present invention, the insertion tip 34 has at least four discharge openings arranged at 90° intervals to provide a relatively uniform subsurface dispersion of pressurized air, gas, liquid, and the like from probe 14.

In accordance with one aspect of the present invention, liquid treatment products such as fertilizer, nutrients, herbicides, pesticides, essentials for plant growth, dispersants, fillers, water, or mixtures or combinations thereof are discharged from openings 30 in or near insertion tip 34 of probe 14 under a charge of pressurized air or gas at about 150 psi or greater, preferably about 200 psi so that these liquids are discharged as a mist which fills or coats the subsurface openings, fractures, cracks, and crevices, created by aeration and up against the roots and feed roots. By utilizing a mist rather than a low pressure liquid, less chemical can be used to cover the same or greater surface area, thereby reducing chemical requirements and reducing environmental hazards caused thereby while still providing the desired benefit to the plants, trees, fruit production, and the like.

It is believed that tree roots and other plant roots can respond to soil improvement, and as the root system improves, the entire tree or plant health improves. Frequently, tree health depends on continuous new root growth in the soil under the tree. Trees with limited new root growth are root bound and produce at less than their full potential. For example, a tree can be alive with adequate foliage, but functioning at 50% or less of its potential because root growth is difficult in soil under the tree. Drainage, pruning, fertilizer, foliar nutrient sprays, and irrigation can be short term solutions, however, the problem is actually the condition of the soil under the tree.

Poor tree or plant root growth can be grouped into four categories: improper soil/water/air balance, poor drainage, compaction, and surface barriers. It is believed that for healthy tree root growth, the soil should be 50% particles, 25% water, and 25% air. If the water in the root zone is over 25%, problems occur, and roots do not grow properly. Likewise, when the soil air content is more than 25%, drought problems can occur. Water in the root zone from poor drainage forces air and oxygen out of the soil and this creates serious problems. Soil compaction from heavy traffic or downward particle infiltration is a serious problem because it slows or stops the movement of water and air into the soil. Barriers to water and air movement such as concrete streets, foundations and patios, are also a problem for root growth.

Further, it is believed that when there is less than sufficient air and oxygen in the root zone, small roots die and active transport of water and minerals into the roots is reduced. When root tips die, plant hormones are not produced and transported to the foliage. Also, when oxygen is not adjacent to the young roots, salt uptake by the roots increases greatly. When there is limited air exchange from the soil, $CO_2$ can accumulate and become toxic to the roots. The negative effect of one or more of these problem factors, can be reduced or eliminated by obtaining an ideal mix of soil, water and air for optimum root and tree or plant growth.

The soil aerator fertilizer 10 of the present invention provides for improved soil conditions which can increase, promote and improve plant or tree root growth, plant or tree growth, and fruit, nut, lumber, or other crop production by aerating, oxygenating, nitrogenating or otherwise gasifying the soil, fracturing, loosening, or breaking up the soil, and, as necessary, adding fertilizer, water, nutrients, pesticides, other essentials for plant or root growth, and/or other soil treatment chemicals or products to the soil. One soil aerator fertilizer method utilizing the apparatus 10 includes the steps of driving the probe 14 into the soil (FIG. 2) by activating hydraulic ram 12, and then aerating the subsurface soil by providing pressurized air or gas from source 52 to discharge openings 30. Following aeration, one may fertilize or otherwise treat the aerated soil by supplying liquid fertilizer, nutrients and/or other chemicals or products from source 52 to discharge openings 30. Fertilization may be followed by additional aeration and fertilization steps as necessary to achieve the desired soil conditions for optimum root, tree, plant, fruit and/or crop growth or production.

Figure 4:
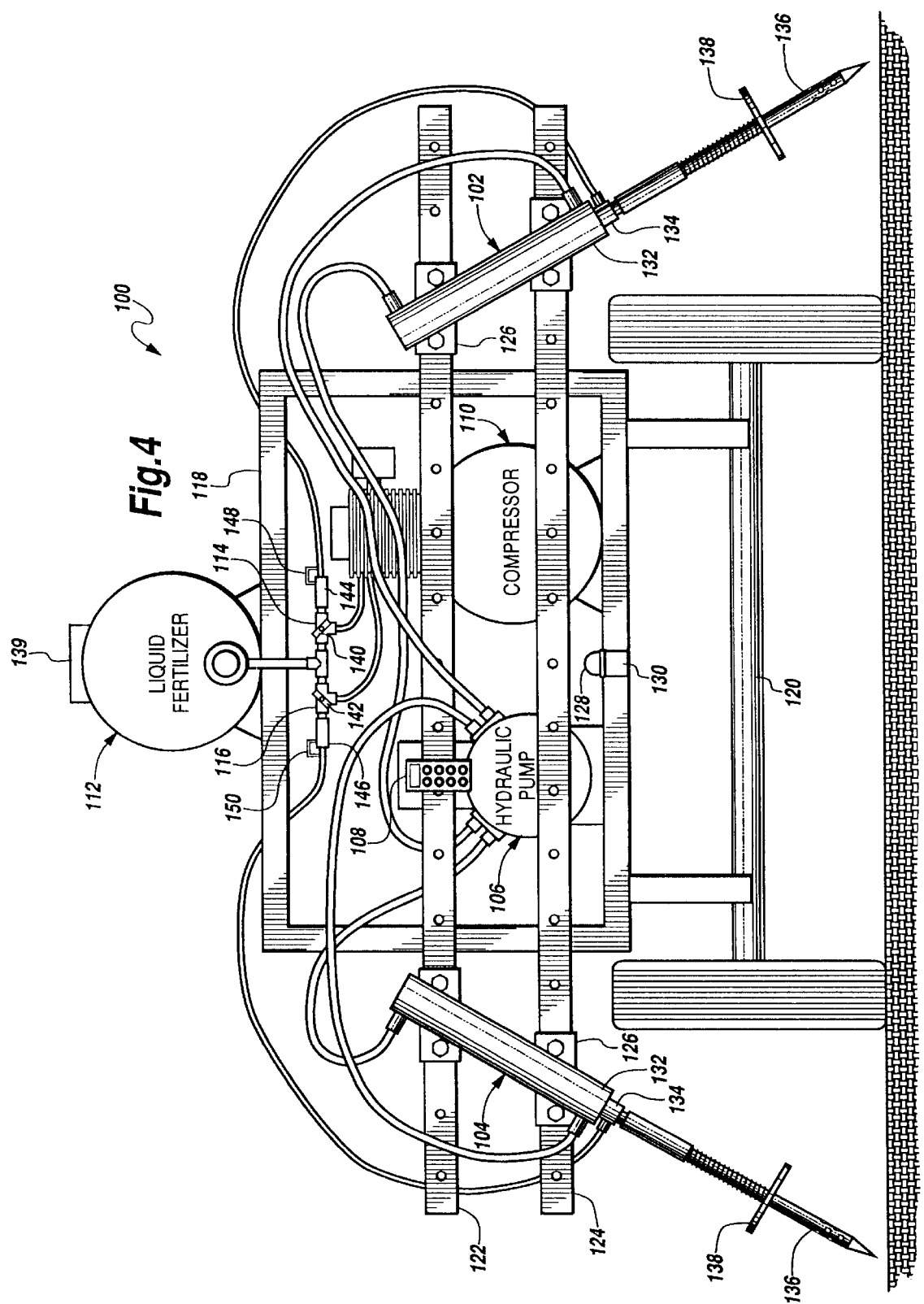
FIG. 4 is a schematic front elevational view of an exemplary mobile soil aerator fertilizer system of the present invention.
Figure 5:
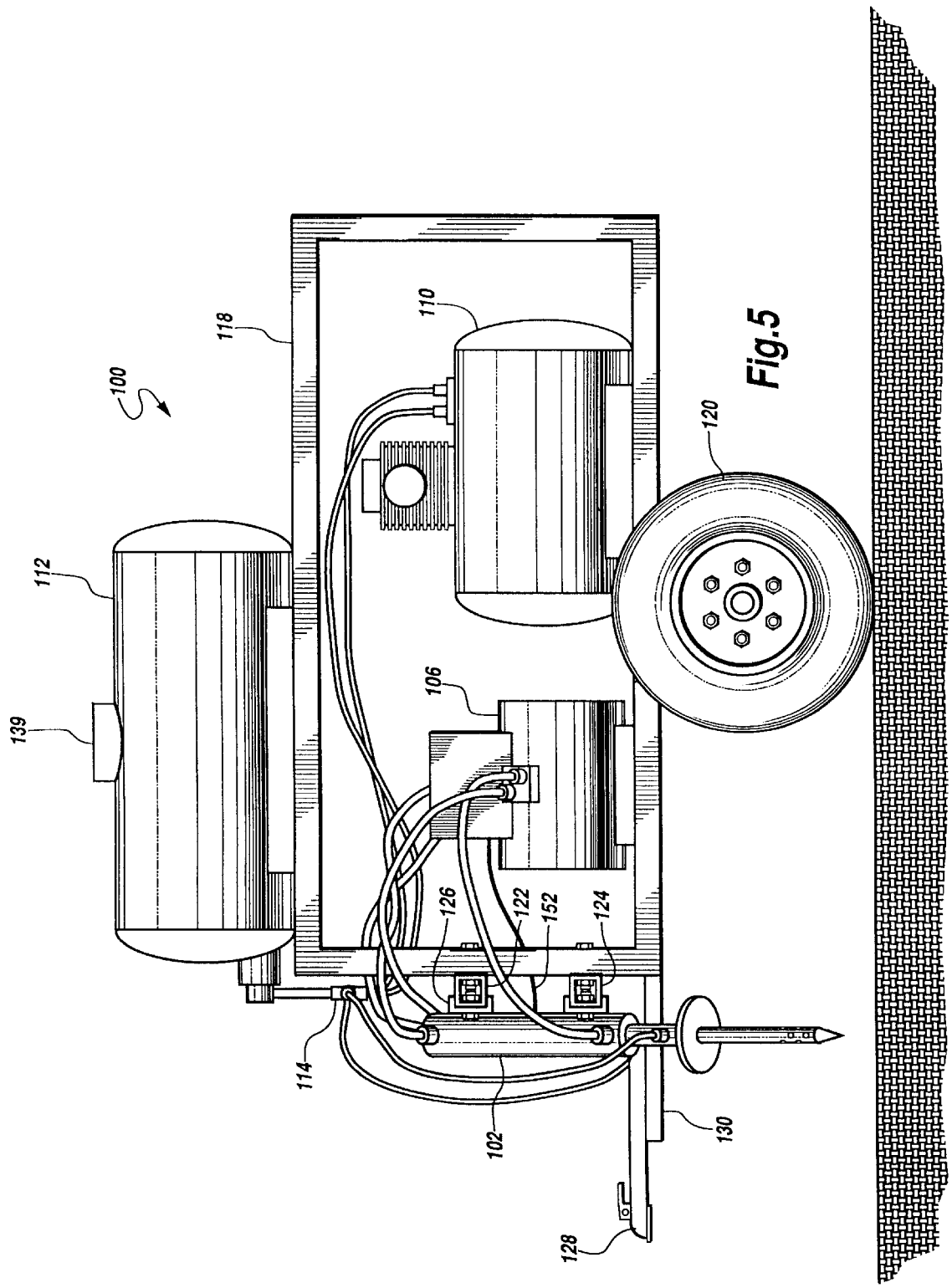
FIG. 5 is a schematic side elevational representation of the mobile soil aerator fertilizer system of FIG. 4.

In accordance with an exemplary embodiment of the present invention as shown in FIGS. 4 and 5 of the drawings, a mobile or portable, self-contained, soil aerator fertilizer system generally designated by the reference numeral 100 includes hydraulic rams 102 and 104, hydraulic fluid supply 106, hydraulic fluid control 108, pressurized air supply 110, liquid supply 112, and compressed air and liquid control valves 114 and 116. The hydraulic fluid, compressed air and liquid supplies 106, 110 and 112 are mounted on a rectangular trailer frame 118 which itself is supported for movement atop a transverse axle and wheel assembly 120. Hydraulic rams 102 and 104 are movably attached to upper and lower transverse support beams or members 122 and 124 by movable mounting brackets 126. The angle and position of the hydraulic rams 102 and 104 can be adjusted by repositioning brackets 126 along support members 122 and 124 and/or by repositioning the support members 122 and 124 on the trailer frame 118.

In the position shown in FIGS. 4 and 5 of the drawings, probes 136 extending from the hydraulic rams 102 and 104 are located above the soil surface with cylinder pistons 134 in their fully retracted positions (FIG. 1). The probes 136 of each of the hydraulic rams 102 and 104 is extended to the soil piercing, penetrating position (FIG. 2) upon application of pressurized hydraulic fluid to the upper hydraulic port of each of the ram cylinders 132, thereby causing extension of the pistons from within each hydraulic cylinder.

A trailer or tow hitch 128 is attached to a tongue 130 which is secured to trailer frame 118. The hitch 128 is adapted to be secured to a tow ball on a tow vehicle such as a four-wheel all-terrain vehicle, a tractor, a truck, and the like. The embodiment shown in FIGS. 4 and 5 of the drawings is especially adapted to be towed behind a four-wheel all-terrain vehicle (ATV) with the control valves or switches 108, 114, and 116 within reach of the vehicle operator. Although it is preferred that the system 100 be in the form of a trailer-type apparatus which is towed, for example, behind a vehicle through an orchard between adjacent rows of trees for simultaneously treating trees in each of the adjacent rows, it is contemplated that the wheel assembly 120 can be removed and the trailer frame 118 can be placed in the bed of a pickup truck or attached to the flat bed of a truck or other trailer device.

If additional weight must be added to the trailer to counteract the dynamic forces produced by the impact of the probes 136 of the hydraulic rams 102 and 104 with the soil to prevent the trailer from being lifted off of the ground and up into the air, weight can be added to trailer frame 118 in the form of weights, concrete blocks, 55 gallon drums filled with liquid, etc. When full, a 55 gallon liquid fertilizer and/or nutrient tank 112 would weight about 500 lbs. Additional stabilizing elements such as extensible feet can be added to trailer frame 118 to prevent undesired rocking or bouncing of the trailer during soil aeration and fertilization.

Hydraulic rams 102 and 104 are identical to hydraulic ram 12 shown in FIGS. 1–3 of the drawings and include the cylinder 132 having upper and lower hydraulic ports, the piston 134, the lower end of which includes a liquid fertilizer and/or nutrient media port, the detachable probe 136 having an insertion tip and one or more discharge openings, and a ground/air seal 138.

In accordance with an exemplary embodiment of the present invention, the soil aerator fertilizer system 100 is operated to simultaneously aerate, fertilize and/or otherwise treat trees in adjacent rows of an orchard as follows: first, trailer hitch 128 of trailer 118 is attached to the tow ball of a tow vehicle. Liquid tank 112 is filled through vent or opening 139 with a liquid media of water, fertilizers, nutrients, fillers, chemicals, and/or other treatment products in a selected concentration which is preferably the minimum concentration required for the job, and, thereby reduce fertilizer costs, environmental hazards, and the like. Next, the fuel tank for the air compressor 110 and hydraulic pump 106 engine is filled.

The air compressor 110 and hydraulic pump 106 can both be driven, for example, by a single, 15 hp Kohler internal combustion engine having a fuel tank holding enough fuel to run for 8 hours or more. For large or remote jobs additional liquid storage tanks and a gasoline or fuel storage tank can be added to the trailer 118 to prevent the need to refill the tanks in the middle of a job.

Next, the trailer is moved to the job site and the internal combustion engine of the hydraulic pump 106 and air compressor 110 is started to build up pressure within the respective tanks thereof. Once the air pressure within the air compressor tank 110 is at about 200 psi or grater, the liquid media in supply tank 112 is agitated, mixed, by turning one of the manually operated valve handles 140 and 142 of valves 114 and 116 to a near vertical position which allows a limited quantity of compressed air to flow through the control valve and up into liquid tank 112. Following a thorough mixing of the fluid within the tank 112, the control valve handle is manipulated so that the handle is rotated to a 450 position so the valve is in a totally off position with no flow from either inlet to the outlet. Trailer 118 is moved to a position between adjacent rows of trees with each of the probes 136 located in the area of the drip line of respective trees on opposite sides of the trailer. Hydraulic control panel 108 is manipulated so as to activate each of the cylinders 132 of hydraulic rams 102 and 104 so as to cause extension of the pistons 134 and insertion of the probes 136 deep within the soil (FIG. 2).

With the discharge openings in or near the insertion tip of each of the probes 136 located beneath the surface of the soil and the air/soil seals 138 positioned at the soil surface (FIG. 2), each of the handles 140 and 142 of the control valves 114 and 116 are rotated 45° to position the handles vertically and in position to allow pressurized air or gas from compressor 110 to flow through pressure relief check valves 144 and 146 and flexible, high-pressure hoses to the probes 136 and discharge openings thereof so as to aerate, fracture, and loosen the soil in the vicinity surrounding each of the probes 136. With a blast of compressed air at about 200 psi, each of the probes can service a soil area of approximately 20 feet in diameter. Then, each of the handles 140 and 142 of control valves 114 and 116 is rotated through 90° so as to position the handle horizontal to allow the flow of liquid mixture or media from tank 112 through each of the control valves and into the region of respective check valves 144 and 146. These check valves are for example 25 pound pressure relief flap-type check valves which prevent the flow of liquid therethrough until application of a pressure of 25 psi or greater. Thus, the check valves 144 and 146 also serve as reservoirs or quantity control elements for controlling the quantity of liquid media which is sent to the probes 136 during liquid treatment of the soil. Each of check valves 144 and 146 includes small vent tubes 148 and 150, for example, ¼ inch diameter or less stainless steel tubes which allow for air to vent around the check valve and allow each of the check valves to fill with liquid media. Although the vent tubes allow a small leakage of fluid, it is such a small amount over the short time that it takes for the check valves to fill with fluid it is negligible. Once the check valves are filled, each of the handles 140 and 142 of the control valves 114 and 116 is rotated through 90° so as again to establish communication between the pressurized air tank 110 and the probes 136. Thus, a blast of pressurized air sends the liquid media through check valves 144 and 146 and out the discharge openings in the buried probes, and into the fractured, loosened, and aerated soil. Consequently a charge of a selected quantity and concentration of fertilizer, nutrients, filler, and/or mixture of other treatment products is disbursed beneath the soil surface in and around roots and adjacent feed roots of the trees.

Again, the handles of control valves 114 and 116 are rotated through 45° to a totally closed position to prevent the movement of compressed air or liquid media through the system. Thereafter, the hydraulic control panel 108 is manipulated to deactivate the cylinders 132, retract pistons 134, and pull the probes 136 out of the soil and into the position shown in FIG. 4. The trailer 118 is now ready to be moved to the next position adjacent the next tree in each of the rows.

In accordance with a particular example of the present invention, the aeration step takes about 10 to 30 seconds, and the fertilization or liquid treatment step takes about 10 to 30 seconds so that the system 100 can service 25 or more, preferably 50 or more trees per hour.

In accordance with a preferred embodiment of the present invention, the trailer 118 is towed behind a tow vehicle which allows the vehicle operator to sit close enough to trailer 118 to reach backwards and manually operate control valves 114 and 116 and hydraulic control panel 108. Also, it is contemplated that the cord between hydraulic pump 106 and control panel 108 is long enough to accommodate the placement of the control panel 108 adjacent the seat of the tow vehicle to facilitate manipulation thereof by the vehicle operator.

In accordance with another example of the present invention, a two person operation can be used while one person operates the tow vehicle and a second person sits on a seat mounted atop tongue 130 and in position facing hydraulic control panel 108 and control valves 114 and 116. It is not intended that the trailer 118 be moved when the probes 136 are inserted and buried within the soil (FIG. 2). Thus, it is important for the tow vehicle operator not to attempt to move the trailer 118 to the next location until the probes 136 have been fully retracted from the soil (FIG. 4).

Although only a pair of opposing hydraulic rams 102 and 104 is shown in the system 100, it is contemplated that additional hydraulic rams can be added on the sides of a trailer just in front of or just behind the wheels and/or added at the back of the trailer. Also, it is contemplated that the hydraulic rams 102 and 104 could be moved to one of these other locations as desired or for stability given a particular use of the system. For example, to counter the dynamic forces of the impact of the probes with the soil, it is desirable to have the hydraulic rams located in the most stable or heaviest area of the trailer.

Also, it is envisioned that the system 100 can be used not only to treat the trees in an orchard or along a roadway, but also to treat the soil in a forest environment, and, as such, the size of the trailer can be minimized to allow for movement in an amongst the trees in a forest, one of the hydraulic rams may be eliminated so as to convert the system to a single probe compact system, and/or the system components can be placed within the bed of a truck or other all terrain vehicle which can maneuver through the forest easily.

Also, it is contemplated that trailer 118 of system 100 can be equipped with spare parts, fuel containers, fertilizer, nutrient or treatment product storage, spare tires, spare components such as probes, seals, hydraulic cylinders, tools for servicing the system, spare control valves, spare batteries, spark plugs, etc. In case of a breakdown in the field, the system operator can readily repair or replace parts as necessary and get the system up and operating in an expedient fashion. For example, should one of the probes be damaged by hitting an immovable object, the system operator can detach and replace the damaged probe with a new probe in short haste.

In accordance with the present invention, the soil aerator fertilizer, system, and method, conserves energy by using tree root oxygenation and soil fracturing to improve tree health, growth, and production and thereby use less land to grow more feet of lumber per acre of ground, to grow more fruit, nuts, and to grow or produce other products. Also, by injecting nutrients, fertilizers, pesticides, and other desirable chemicals or treatment products as may be prescribed by soil treating horticulturists, tree or plant health growth and product production can be improved. It is believed that annual aeration and fertilization can increase tree growth three fold.

By improving soil conditions and encouraging root growth through soil aeration, fertilization and/or treatment, the newly exposed root areas and newly added feeder roots are able to take in additional nutrients that can be injected following aeration. By adding the treatment chemicals, fertilizers, nutrients, etc. below the ground surface, the contamination of rivers, lakes, and streams by runoff of the treatment chemicals is prevented.

The soil aerator fertilizer of the present invention also conserves energy by requiring the usage of reduced amounts of fertilizers and other treatment chemicals to provide the desired improvement in root and tree growth, lumber production, and the production of more and larger products such as fruits and nuts. According to general agricultural recommendations, for medium fertile soil it is recommended that 60 lbs. of nitrogen be added per acre. Since the air we breath contains about 79.5% nitrogen, the soil aerator fertilizer of the present invention adds nitrogen during the aeration step thereby reducing the nitrogen fertilizer requirement to only about 19.5% of the 60 lbs. per acre recommendation or 11.7 lbs. of nitrogen per acre. Also, if no soil test is done, it is recommended that the root zone be expanded by aeration or fracturing of the soil and that no fertilizers be fed. Of course if soil test and leaf analysis justify the use of chemicals and micronutrients, the soil aerator fertilizer of the present invention still provides enormous savings since only small amounts, for example, 10–20% of the usual dosage of treatment chemicals and nutrients should be injected following aeration and fracturing of the subsurface soil. For example, the U.S. Department of Agriculture recommends using 20 lbs. of P205 per acre and 20 lbs. of K20 per acre. Using the soil aerator fertilizer of the present invention, only 10% of this recommended dosage or 2 lbs. of P205 and 2 lbs. of K20 need be injected per acre. This dramatic reduction in the usage of chemicals and nutrients not only reduces the cost of treating the acreage, but also reduces the environmental hazards of fertilizer runoff, and the like.

The soil aerator fertilizer system 100 provides for the rapid, safe, and effective treatment of soil and plants to promote plant growth, expand the root zone, to allow for the addition of nutrients, fertilizers, pesticides, fillers, and other treatment chemicals, reduces costs by eliminating or reducing fertilizer and chemical requirements, provides for the subsurface injection of possibly hazardous materials such as fertilizers, herbicides, pesticides, weed killers, insecticides, provides for subsurface irrigation and oxygenation of substrata root systems, loosens, breaks, fractures, aerates, oxygenates, fertilizes and otherwise chemically treats the soil, and thereby can be used to improve the health, growth, and production of trees, plants, shrubs, flowerbeds, crops, fruits and nuts, for the controlled subsurface injection of specified quantities of agricultural chemicals, microorganisms, bacteria, purified gases, provide for the correction or modification of soil/water/air ratios, improve drainage, compaction, and surface barrier conditions.

Figure 6:
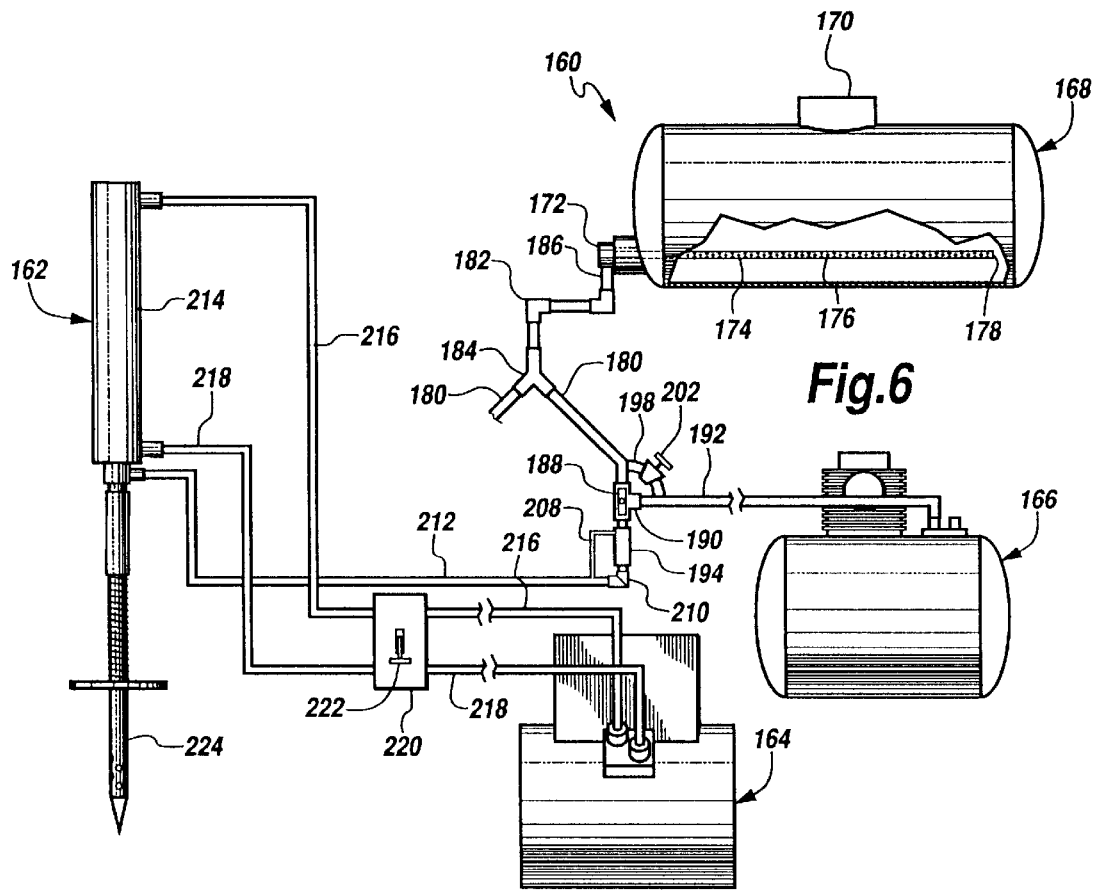
FIG. 6 is a schematic view illustration of a soil aerator fertilizer in accordance with one example of the present invention.
Figure 7:
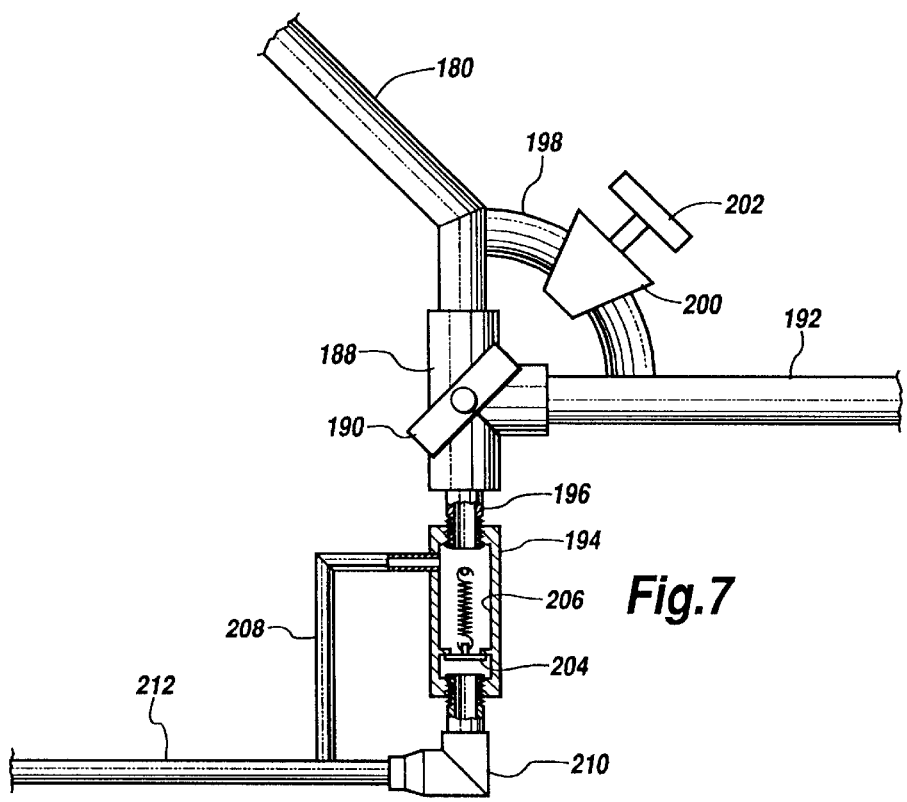
FIG. 7 is an enlarged detail view of the pressurized air and liquid fertilizer and/or nutrient mixture flow control elements of FIG. 6.

With reference to FIGS. 6 and 7 of the drawings, and in accordance with another exemplary embodiment of the present invention, a soil aerator fertilizer system or apparatus generally designated 160 includes one or more hydraulic rams 162, a hydraulic pump or supply 164, an air compressor or supply 166, and a liquid tank or supply 168.

The system 160 is similar to the system 100, for example, the hydraulic ram, hydraulic pump, air compressor and supply tank are identical to those shown in FIGS. 4 and 5 of the drawings, except for limited differences described below.

Liquid supply tank 168, such as a 55 gallon drum, includes a liquid inlet 170 and a liquid outlet 172. Connected to the outlet 172 is an aero agitator or turbulator 174 made up of an elongate length of pipe 176 having numerous small openings along its length, and an enclosed end 178. In accordance with one example of the present invention, the aero agitator 174 is a length of ¾ inch diameter perforated PVC pipe which attaches to a barrel bung with a ¾ inch diameter nipple.

Outlet 172 of supply tank 168 is attached to a liquid supply line 180, 90° elbows 182, Y fitting 184, via a quick-connect 186. Y fitting 184 provides liquid to two different flow control valves with only one valve shown for the sake of clarity. Hose 180 is attached to one end of a three opening, four position, high pressure T-valve 188 having a manually rotatable valve handle 190. The other inlet to the T-valve 188 is a ¾ inch diameter high pressure hose 192 which is attached to the pressurized air outlet of air compressor 166. Hose 192 is shown broken since pressurized air is supplied to both the T-valve 188 and other T-valves not shown. The outlet of T-valve 188 is connected to a pressure relief flap-type check valve 194 by a length of ¾ diameter hose 196.

A bypass hose 198 and a screw type air valve 200 with a manually operated handle 202 provide selective communication between hose 192 and hose 180. Air valve 200 is opened slightly when it is desired to allow pressurized air from compressor 166 to flow upwardly through the hose 180 and up into tank 168 via the aeroagitator or turbulator 174. The escape of pressured air from the numerous small openings in pipe 176 provides a thorough agitation, mixing and turbulation of the liquid and additives within the tank 168. At all other times during the operation of the system 160 other than aeroagitation of the liquid within the tank 168, air valve 200 is closed so as to prevent the passage of air from hose 192 to hose 180.

Check valve 194 is, for example, a 25 lb. pressure relief flap-type check valve having a 6 inch overall length and ¾ inch inner diameter inlet and outlet openings. Check valve 194 includes a closure flap 204 biased in a closed position by a spring, and has an inner cavity 206 with an approximate volume of ½ pint. It is preferred that the fittings, valves, control valves and check valves be formed of stainless steel, but may also be made up of noncorrosive high strength PVC high pressure fittings and valves. A ¼ inch diameter stainless steel vent tube 208 has been added to check valve 194 to allow for the venting of air therefrom during the gravity filling of the check valve cavity 206 with liquid from liquid storage tank 168. The lower end of vent tube 208 is seated in a 90° high pressure L with a ¾ inch inlet and a ½ inch outlet to serve as a reducer from a ¾ inch diameter hose down to a ½ inch diameter high pressure hose.

If the system 160 is used to service only a single hydraulic ram 162, the Y fitting 184 can be removed. If the system 160 is used to service more than two hydraulic rams, additional Y fittings can be added. Likewise, the compressed air and hydraulic lines can service a plurality of hydraulic rams by implementing T or Y fittings therein.

Hydraulic ram 162 includes a cylinder 214 and probe 224. Hydraulic cylinder 214 operatively attached to hydraulic pump 164 via flexible high pressure hydraulic lines 216 and 218, and a hydraulic lever or switch 220 having a manually operated handle 222. In the position shown in FIG. 6 of the drawings, the handle 222 of hydraulic switch 220 is shown in the lower position applying hydraulic fluid under pressure to hydraulic line 218 so as to force the piston of the cylinder 214 into its fully retracted position. Movement of the handle 212 to its upper hydraulic ram extending position causes hydraulic fluid under pressure to flow through line 216 to the upper end of the cylinder which forces complete extension of the piston and insertion of the probe 224 into the soil (FIG. 2).

With the hydraulic ram in its fully extended position (FIG. 2), the probe is partially buried within the soil so that the discharge openings in or near the insertion tip thereof are located subsurface and in position to provide for aeration, fertilization and other treatment of the substratus soil. Aeration is accomplished by rotating handle 190 on T valve 188 clockwise 45° to a position to allow pressurized air from line 192 to flow through valve 188 and check valve 194. Since the pressurized air is at a pressure greater than 25 psi it forces the flap 204 downward against the bias of the retaining spring and allows for passage of the pressurized air through the valve 194 and on through line 212, the probe 224 and into the soil so as to aerate, fracture, loosen, oxygenate, and nitrogenate the soil.

Next, handle 190 is rotated clockwise 90° so as to position the handle vertical and allow the free fall of liquid from tank 168 through outlet 172 down through line 180 through valve 188 and into the reservoir 206 of check valve 194. Check valve 194 is selected so that the gravity pressure of the liquid in the line 180, line 196 and in the cavity 206 is insufficient to open the check valve and allow flow therethrough. Vent tube 208 allows air to be vented from the cavity 206 to facilitate the filling of the cavity with the liquid from tank 168. Although vent tube 208 allows for leakage of fluid around the valve, this small amount of leakage can be ignored or taken into account as part of the total charge of liquid which is discharged from the probe. The concentration of the chemicals in the liquid in tank 168 and/or the length of hose 196 and valve 194 is adjusted so that the minimum chemical requirement is all that is added. After a gravity fill of the cavity 206 with liquid from the tank 168, valve handle 190 is rotated 90° counter-clockwise to again provide communication between pressurized air line 192 and check valve 194. In so doing, a blast of pressurized air forces the liquid in cavity 206 through the valve 194, line 212, probe 224, and out the discharge openings in the lower end thereof as a liquid mist which fills the openings created during aeration.

In accordance with another embodiment of the present invention, the liquid tank 168 can be pressurized, and the amount of liquid treatment media added during fertilization and/or treatment following aeration is controlled by the time or duration that T valve 188 is positioned to allow for the flow of liquid from the tank of 168 to the line 212. In such an embodiment, the check valve 194 can be eliminated from the system.

Figure 8:
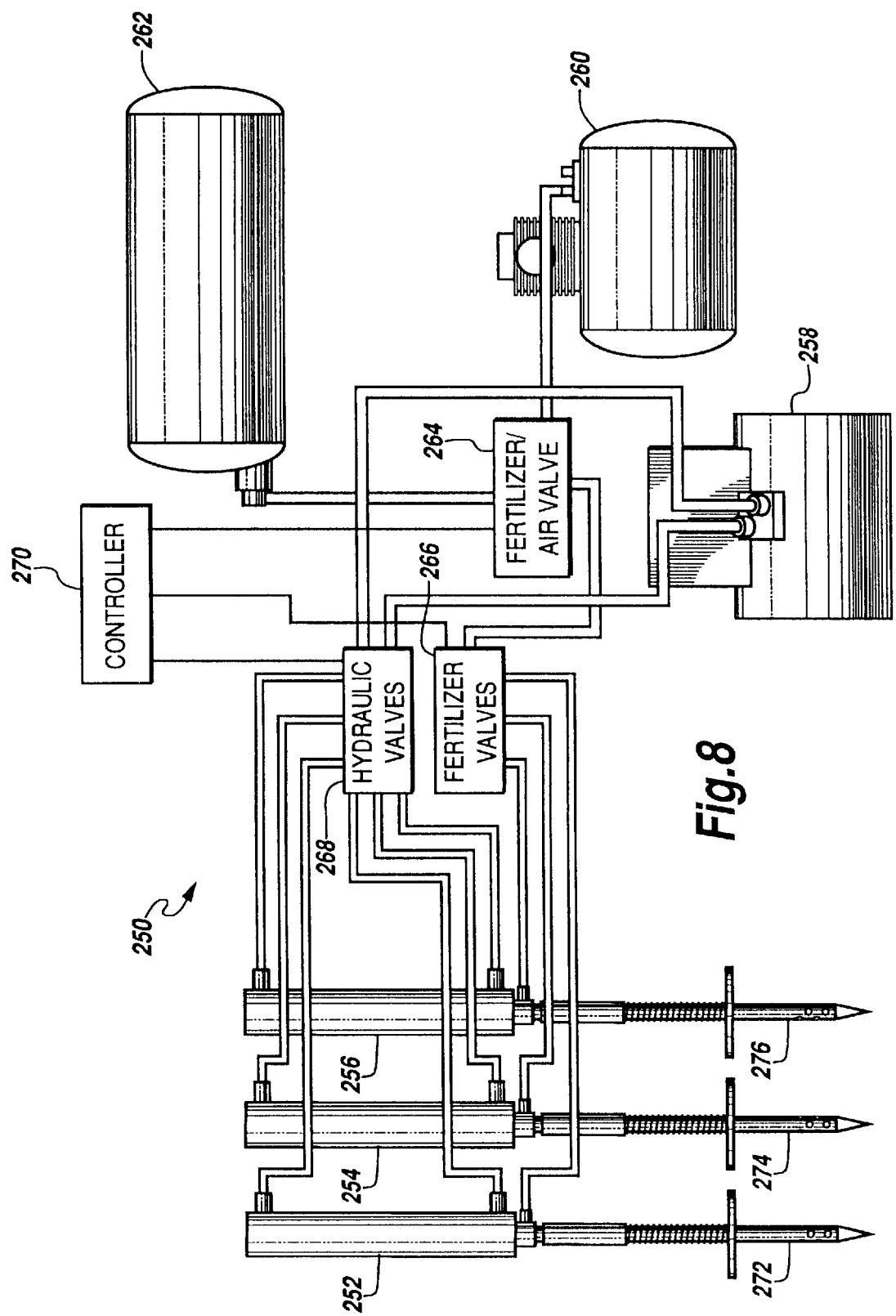
FIG. 8 is a schematic view representation of a soil aerator fertilizer in accordance with another example of the present invention.

In accordance with another exemplary embodiment shown in FIG. 8 of the drawings, an automated soil aerator fertilizer apparatus generally designated by the reference numeral 250 includes a plurality of hydraulic rams 252, 254, 256, a hydraulic pump 258, an air compressor 260, and a liquid supply tank 262. The apparatus 250 differs from the systems 160 and 100 in that the manually operated control valves and check valves have been replaced by electronically controlled solenoid valves 264, 266 and 268 operated by computer control system or controller 270. Controller 270 is programmed to produce a soil aerator fertilizer sequence by first activating hydraulic valves 268 to provide for extension of the hydraulic rams and insertion of the respective probes 272, 274, and 276 into the soil. Next, controller 270 activates valve 264 to allow pressurized air or gas to flow therethrough and activates valves 266 to allow pressurized air to flow therethrough and into each of the respective probes 272, 274, and 276 so as to aerate fracture, loosen, oxygenate, nitrogenate, etc. the subsurface soil.

Following aeration, controller 270 activates valve 264 to provide for the flow of liquid from tank 262 therethrough and towards fertilizer valves 266. Depending on the pressure in tank 262, controller 270 either actuates fertilizer valves 266 to allow the flow of pressurized liquid therethrough and into probes 272, 274 and 276 or activates valve 264 to allow the flow of pressurized air from tank 260 to force or blast the liquid between valves 264 and 266 through the valves 266 and to probes 272, 274, and 276.

Following aeration and fertilization or liquid treatment, controller 270 may provide an additional aeration sequence to clear any liquid from the lines between the valve 264 and fertilizer valves 266, between the fertilizer valves 266 and the probes 272, 274, and 276, and from the probes. This additional aeration step may also serve to further seat the liquid mist applied to the subsurface voids and fractures created during initial aeration and up against the roots and feed roots of the plants. Lastly, controller 270 activates hydraulic valves 268 so as to cause retraction of the pistons of hydraulic rams 252, 254, and 256, and cause withdrawal of the probes 272, 274, and 276 from the soil. This readies the system for movement to the next treatment location and a repeat of the above described soil aeration fertilization sequence.

Valves 264, 266, and 268 are preferably conventional high pressure electronic or pneumatic solenoid valves operated by a conventional low voltage electronic programmable controller. Again, the concentration of chemical added during fertilization or treatment following aeration is controlled by adjusting the concentration of the chemical within tank 262, adjusting the length of the hose between valves 264 and 266, and/or adjusting the duration that valve 264 is activated and allows the flow of liquid from tank 262 therethrough. It is preferred that compressor 260 provide pressurized air at 200 psi or greater, liquid tank 262 provide treatment liquid media containing water, fertilizer, nutrients, pesticides, insecticides, and/or another treatment chemicals at a pressure of 200 psi or greater, and that hydraulic pump 258 provide pressurized hydraulic fluid to hydraulic rams 252, 254, and 256 at 1500 psi or greater.

Thus, it will be appreciated that as a result of the present invention, a highly effective improved soil aerator fertilizer, system and method is provided, by which the principal objective, among others is completely fulfilled. It is contemplated and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

I claim:

1. A fertilizer injection system for sequentially driving at least one probe into the soil, injecting at least one of air and liquid products into the soil, and then removing the probe, comprising:

at least one hydraulic ram having an elongate cylinder with respective hydraulic fluid ports for introducing and extracting hydraulic fluid, a piston at least partially received within said elongate cylinder with one end extending outwardly from said cylinder, an elongate fertilizer probe having a first end attached to said one end of said piston, a second end terminating in an insertion point with at least one discharge opening, and an elongate fluid passage extending from said first end of said probe to said discharge opening, at least one fertilizer port for receiving and delivering at least one of pressurized air and liquid products to said elongate passage at said first end of said probe, said fertilizer port being located in said one end of said piston adjacent said first end of said probe, a source of hydraulic fluid for selectively supplying hydraulic fluid to said hydraulic fluid ports of said cylinder, a source of pressurized air for selectively supplying pressurized air to valve means, a source of liquid products for supplying said liquid products to said valve means, said valve means for selectively directing at least one of pressurized air and liquid products, to said fertilizer port for discharge from said probe into the soil following insertion of said probe into the soil, and hydraulic control means for selectively controlling the extension of said piston and insertion of said probe into the soil and the retraction of said piston into said cylinder and withdrawal of said probe from the soil.

2. The system as recited in claim 1 wherein said valve means comprises a four position three way flow control valve having a first inlet operatively connected to said pressurized air source, a second inlet operatively connected to said source of liquid products and an outlet operatively connected to said fertilizer port, whereby said flow control valve is placed in selected positions to selectively supply at least one of pressurized air liquid products, and a combination thereof to said probe.

3. The system as recited in claim 2 further comprising:

a fertilizer quantity control dispenser assembly downstream of said control valve and including a pressure relief check valve, and a section of conduit upstream thereof.

4. The system as recited in claim 3, wherein said dispenser assembly further includes a vent tube for venting air from the upstream end of said conduit section.

5. The system as recited in claim 1 wherein said system is mobile and further comprises a frame for supporting said at least one hydraulic ram, source of hydraulic fluid, source of pressurized air, and source of liquid products, and wheel means providing for mobility of said frame.

6. The system as recited in claim 1 comprising a plurality of hydraulic rams each having a respective probe attached to the piston thereof.

7. The system as recited in claim 1, further comprising a ground-air seal assembly including a sealing disc having a central opening sized to receive said probe, and a spring having a first end attached to said disc and a second end attached to said probe, whereby said disc is allowed limited travel along said probe to accomodate variations in the insertion depth of said probe.

8. The system as recited in claim 1, wherein said hydraulic fluid source comprises a hydraulic pump and at least one control valve, said pressurized air source comprises an air compressor, and said source of liquid products comprises at least one liquid storage tank.

9. The system as recited in claim 8, wherein said liquid storage tank includes an aeroagitator made up of an elongate section of pipe having a plurality of small openings along its length, one end attached to an outlet of said tank and the other end closed, said system further comprising a compressed air bypass valve for supplying compressed air to said aeroagitator of said liquid storage tank.

10. The system as recited in claim 1 wherein said liquid products are selected from the group of water, fertilizer, nutrients, fillers, chemicals, and combinations thereof.

11. In an apparatus for treating the soil to improve plant growth by sequentially driving at least one probe into the soil, injecting at least one of air and liquid products into the soil, and then removing the probe, the improvement comprising:

at least one hydraulic ram having an elongate cylinder with respective hydraulic fluid ports for introducing and extracting hydraulic fluid, a piston at least partially received within said elongate cylinder with one end extending outwardly from said cylinder, an elongate fertilizer probe having a first end attached to said one end of said piston, a second end terminating in an insertion point with at least one discharge opening, and an elongate fluid passage extending from said first end of said probe to said discharge opening, at least one fertilizer port for receiving and delivering at least one of pressurized air and liquid products to said elongate passage at said first end of said probe, said fertilizer port being located in said one end of said piston adjacent said first end of said probe, a source of hydraulic fluid for selectively supplying hydraulic fluid to said hydraulic fluid ports of said cylinder, a source of pressurized air for selectively supplying pressurized air to valve means, a source of liquid products for supplying said liquid products to said valve means, said valve means for selectively directing at least one of pressurized air and liquid products to said fertilizer port for discharge from said probe into the soil following insertion of said probe into the soil, hydraulic control means for selectively controlling the extension of said piston and insertion of said probe into the soil and the retraction of said piston into said cylinder and withdrawal of said probe from the soil, wherein said valve means comprises a four position three way flow control valve having a first inlet operatively connected to said pressurized air source, a second inlet operatively connected to said source of liquid products, and an outlet operatively connected to said fertilizer port, and whereby said flow control valve is placed in selected positions to selectively supply at least one of pressurized air, liquid products, and a combination thereof to said probe.

12. The apparatus as recited in claim 11 wherein said liquid products are selected from the group of water, fertilizer, nutrients, fillers, chemicals, and combinations thereof.

13. A fertilizer injection system comprising:

at least one hydraulic ram having an elongate cylinder with respective ports for introducing and extracting hydraulic fluid, a piston at least partially received within said elongate cylinder with one end extending outwardly from said cylinder, an elongate fertilizer probe having a first end attached to said one end of said piston, a second end terminating in an insertion point with at least one discharge opening, and an elongate fluid passage extending from said first end of said probe to said discharge opening, a source of hydraulic fluid for selectively supplying hydraulic fluid to said ports of said cylinder, a source of pressurized air for selectively supplying pressurized air to said fluid passage in said probe, a source of liquid products for supplying said liquid products to said fluid passage in said probe, valve means for selectively directing at least one of pressurized air and liquid products to said probe for discharge into the soil following insertion of said probe into the soil, said valve means including a four position three-way flow control valve having a first inlet operatively connected to said pressurized air source, a second inlet operatively connected to said liquid products fertilizer source, and an outlet operatively connected to said fluid passage in said probe, whereby said flow control valve is placed in selected positions to selectively supply at least one of pressurized air, liquid products, and a combination thereof to said probe, and hydraulic control means for selectively controlling the extension of said piston and insertion of said probe into the soil and the retraction of said piston into said cylinder and withdrawal of said probe from the soil.

14. The system as recited in claim 13 wherein said valve means further includes a fertilizer quantity control dispenser assembly including a pressure relief check valve, a section of conduit upstream thereof, and a vent tube for venting air from the upstream end of said conduit section.

15. The system as recited in claim 13 wherein said liquid products are selected from the group of water, fertilizer, nutrients, fillers, chemicals, and combinations thereof.

* * * * *